No. 622,581. Patented Apr. 4, 1899.
W. J. WORKMAN.
TANK FOR TRANSPORTING LIVE FISH.
(Application filed Mar. 25, 1898.)
(No Model.)
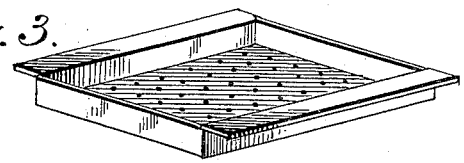
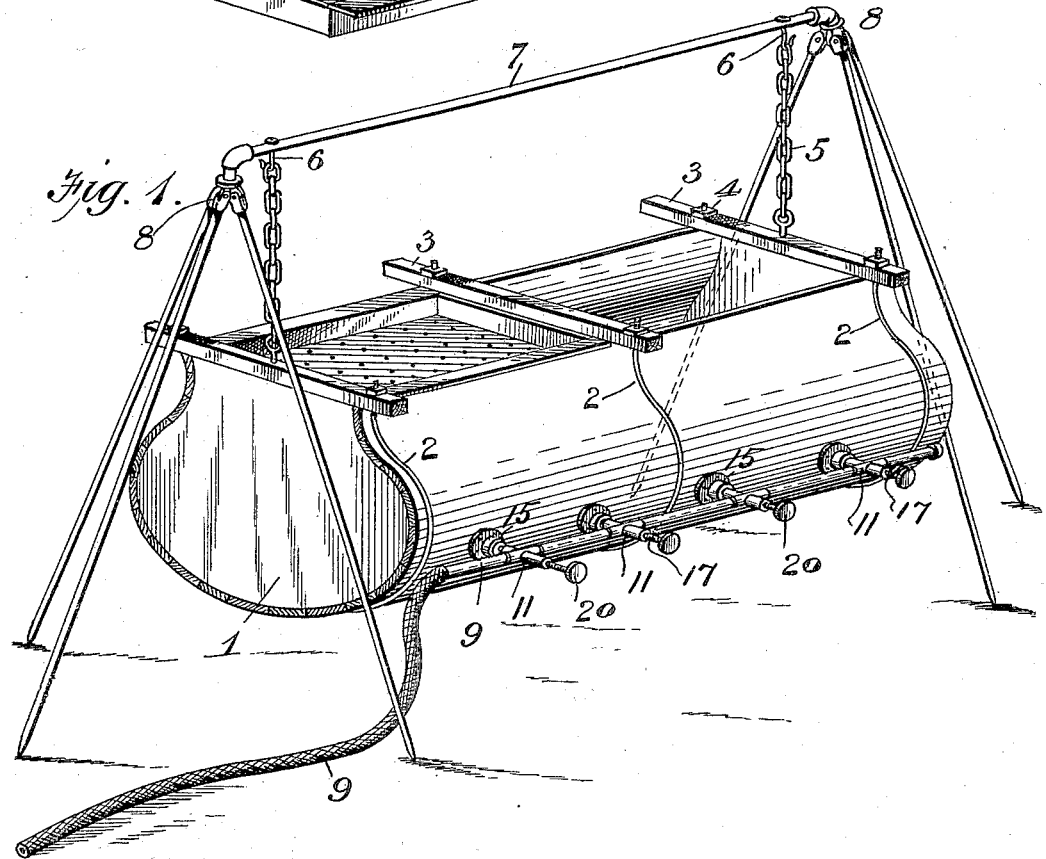
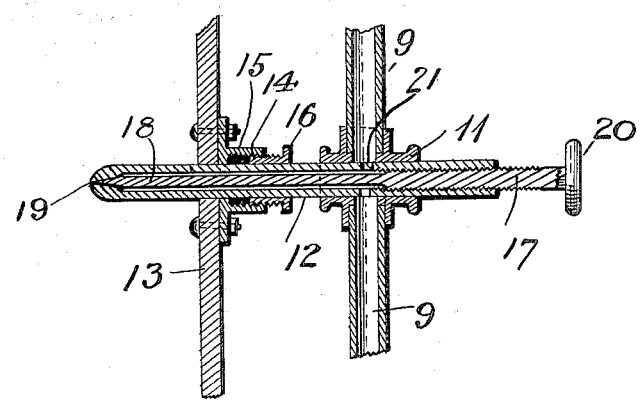
Witnesses
Franck L. Ourand
E. E. Overholt
W. J. Workman,
Inventor
By
W. T. FitzGerald
Attorneys.
THE NORRIS PETERS CO., PHOTO-LITHO., WASHINGTON, D. C.

UNITED STATES PATENT OFFICE.

WILLIAM J. WORKMAN, OF ASHLAND, KANSAS.

TANK FOR TRANSPORTING LIVE FISH.

SPECIFICATION forming part of Letters Patent No. 622,581, dated April 4, 1899.

Application filed March 25, 1898. Serial No. 675,200. (No model.)

*To all whom it may concern:*

Be it known that I, WILLIAM J. WORKMAN, a citizen of the United States, residing at Ashland, in the county of Clark and State of Kansas, have invented certain new and useful Improvements in Tanks for Transporting Live Fish; and I do hereby declare the following to be a full, clear, and exact description of the invention, such as will enable others skilled in the art to which it appertains to make and use the same.

My invention, as will be hereinafter fully described and claimed, and illustrated in the accompanying drawings, relates to certain new and useful appliances designed to insure the safe shipment or transportation of live fish from place to place and in certain novel devices designed to introduce either prepared or natural atmosphere into the water containing the fish, the object being to prevent such water from becoming stagnant and unfit for its purpose.

My invention further consists in means for preserving the desired temperature deemed most suitable.

A further object, among others, is to so mount the tank in position that it will be protected against vibrations or jars incident to its transportation from point to point, thus rendering it possible to transport the fish contained in the tank with entire safety from place to place, even though long distances intervene.

In the accompanying drawings, Figure 1 is a perspective view of my improved fish-transporting tank and the accessories deemed necessary in making it completely operative. Fig. 2 is a detail showing a central section of the means employed to introduce air into the water contained in the tank. Fig. 3 is an ice-receptacle designed to fit over the top of the tank and to receive portions of cracked ice when it is desired to lower the temperature of the water in the tank.

With the foregoing objects in view I provide certain details of combination and arrangement of parts to provide the accessories deemed necessary to introduce into the water contained in the tank a continuous flow of air under heavy pressure, releasing the same, preferably, in the bottom of the tank in minute quantities or jets of air, resulting in a thorough aeration of the water, thereby preventing the same from becoming stagnant or unfit for transporting live fish. By thus aerating the water it is rendered entirely unnecessary to change the contents of the tank except at long intervals, the impact of the jet of air under heavy pressure being sufficient to gently, though thoroughly, agitate every particle of water, thus restoring and supplying the necessary life-giving properties thereto. If air is introduced in large quantities, it immediately rises to the surface and passes away in large bubbles. I provide means for introducing a small jet of air throughout the lower part of the tank, thereby gaining the benefit not only of the restoration of the necessary oxygen to the water, but also the physical effect of the mechanical disturbance of the globules of the water, resulting in a larger absorption of the air by the water and the consequent retention of a greater amount of air, thus placing the water in an excellent condition for rendering it desirable for sustaining the life of the fish. A further result of introducing air in minute jets is in inducing a circulation of the water and in reducing the temperature thereof by a sudden expansion of the air at the point of exit or at the surface of the water.

It may be briefly stated that my invention consists in providing a suitable receptacle or tank and means for supporting the same and protecting the contents of the tank from undue vibrations or jars and additional means for introducing a regulated quantity of prepared or natural atmosphere preferably into the bottom of the tank that the water contained therein may be thoroughly aerated and incidentally purified, to the end that the natural tendency of the water to stagnate and become impure will be checked, thus preserving such medium in its original wholesome condition.

Referring in detail to the several parts of my invention, 1 represents the tank, which may be made substantially as shown or in any other preferred form, which should be properly reinforced at either end and at intervals throughout its length, as by the locking bands or compressions 2, the upper ends of said compressions being secured in any preferred way, as by the transversely-disposed brackets 3 and the locking-nuts 4, as clearly shown.

It will be understood that in lieu of the form of tank just referred to an ordinary barrel of proper size may be used, in which case the central portion of the upper side should be cut away to receive the ice-pan, hereinafter more specifically referred to.

Each end of the tank is provided, preferably, with the supporting-chain 5, the upper end of which may be attached to the sustaining-hooks 6, suitably mounted in the supporting beam or rod 7, each end of said rod being sustained, preferably, by the tripod 8, the legs of which may be disposed in any suitable way to provide against lateral and endwise strain, it being understood that the ends of said legs may be provided with suitable feet, by means of which they may be permanently secured to the floor, or said ends may be sharpened, as shown in Fig. 1, which arrangement will enable the parts to reliably hold their adjusted position.

The essential feature of my invention consists in providing means for introducing a jet of air into the water contained in the tank, the preferred means being illustrated in Figs. 1 and 2 and consisting of the stationary pipe 9, which is in connection, as by the flexible hose 10, with any suitable form of air-pump or air-reservoir. The pipe 9 is provided at intervals with the unions 11, by means of which the jet-tube 12 is placed in communication with the interior of the tube 9 and the water contained in the tank.

In Fig. 2 it will be seen that the part indicated by 13 represents a section of the tank through which the end of the jet-tube 12 extends, leakage around said tube being prevented by the collar 14, containing the packing or stuffing box 15 and receiving the compression-thimble 16, the operation of which will be readily understood.

The union 11, it will be seen, enables the pipe 9 to be made in sections and properly connected with said union by suitable threads, the jet-tube 12 being designed to pass entirely through said union and is provided upon its outer end with an interiorly-threaded face designed to receive the enlarged threaded stem of the jet-regulator 17. The inner part 18 of said regulator, being of less diameter, will freely pass into the interior of the inner end of the jet-tube 12, and as the extreme end of said regulator is provided with a needle-point the minute aperture 19, provided in the inner end of the jet-tube, may be entirely closed by turning the threaded portion 17 home in its threaded seat by means of the operating-handle 20, as will be clearly apparent.

The jet-tube 12, it will be seen, is provided on either side, at a point communicating with the interior of the tube 9, with suitable apertures 21, or, as will be readily apparent, the jet-tube may be entirely severed at this point, the object being to permit the air within the tube 9 to pass freely into the jet-tube 12 and thence out of the aperture 19 or entirely through the jet-tube into the opposite aperture and into the adjacent section of the tube 9. While I have described the preferred construction of the several parts, it will be readily apparent that the equivalent thereof is comprehended by me, and I do not, therefore, wish to be confined strictly to the exact showing I have set forth.

The operation of my improved fish-tank may be stated to be as follows: An air-pump of the usual construction may be connected to the flexible hose-tank, or in cases where the tank is to be shipped a long distance I prefer to attach the flexible tube to an air-tank which has been previously filled by a suitable air-pump, it being understood that said air-tank may be readily disposed under the fish-tank or other convenient point and is designed to contain a sufficient quantity of air to meet the requirements of each journey. The desired quantity of air to be introduced may be readily controlled by means of the needle 18, as by a proper manipulation of the operating-handle 20 said needle-point may be thrust inward, so as to entirely close the aperture 19, or may permit the air to escape freely therefrom or only in minute quantities.

It will be readily apparent from the construction fully disclosed in Fig. 2 that any of the jet-controlling devices may be entirely closed without interfering with the operation and efficiency of the others, since it will be clear that the first jet-controlling device may be so manipulated that it will prevent any introduction of air at this point, yet will permit the air to freely pass through the apertures 21 into coöperation with the succeeding controlling device.

The ice-box (shown in Fig. 3) is adapted to fit and close the upper side of the tank and is easily removed and replaced.

Believing that the advantages, use, and construction of my improved fish-shipping tank have been made fully apparent, I will dispense with further reference to the details.

Having thus fully described my invention, what I claim as new, and desire to secure by Letters Patent, is—

1. As an improvement in tanks for transporting live fish, the combination with a suitable reservoir and means for holding the same in substantially a horizontal plane, of an air-supply pipe fixedly attached to said reservoir and in communication by means of a series of laterals or extensions, with the interior of said reservoir, and an adjustable needle-point for each of said laterals whereby a quantity of air introduced into the reservoir may be regulated as desired, as specified and for the purpose set forth.

2. As an improvement in tanks for transporting live fish the combination with a suitable reservoir and means for holding the same in a substantially quiescent position, of an air-supply pipe secured to said reservoir and provided with a series of laterals or extensions passing through the wall of the reservoir and communicating with the interior thereof, suitable means for forming a water-tight joint around said laterals as they pass through said wall, and a needle-valve carried by each of said laterals whereby the desired quantity of air to be introduced into the water may be readily controlled as specified and for the purpose set forth.

3. The combination with a tank or reservoir and suitable means for holding the same in a substantially quiescent position, of the herein-described device for regulating a current of air to be introduced into the water contained in said reservoir, consisting of a fixed pipe having a series of branches disposed substantially at right angles thereto, said branches being designed to enter the tank, an adjustable needle-point located in each of said branches and having a threaded connection therewith and designed to open or close the aperture in the inner end of each branch whereby a large or minute quantity of air may be introduced, as specified and for the purpose set forth.

4. As an improvement in shipping-tanks for live fish, &c., the combination with a suitable reservoir and means for holding the same in a substantially horizontal position, of an air-supply pipe secured to the outer side of said reservoir and provided with a series of laterals or pipes 18 extending through the walls of the reservoir; packing-cups 15 attached to the outer side of the reservoir and provided with a central aperture designed to receive said laterals, suitable packing surrounding said laterals within said cup and a threaded cap encircling said lateral and engaging said cup whereby a water-tight joint is provided, and an exteriorly-threaded tapered needle received by the outer end of said lateral whereby the flow of air through the aperture 19 provided in the inner end of said lateral may be regulated as desired, as specified and for the purpose set forth.

5. As an improvement in shipping-tanks for live fish &c., the combination with a reservoir and suitable means for holding the same in a horizontal position, of an air-supply pipe 9 having a series of cross heads or joints each carrying a lateral or pipe 18 designed to extend through the walls of the tank, the opposite end of said lateral being interiorly threaded; suitable means for forming a water-tight joint around said lateral as it passes through the wall of said tank, and an exteriorly-threaded needle fitting the outer end of said lateral and extending into coöperation with the aperture 19 whereby the air passing from the supply-pipe 9 through suitable apertures provided in the lateral 18, may be controlled as desired, as specified and for the purpose set forth.

In testimony whereof I affix my signature in presence of two witnesses.

WILLIAM J. WORKMAN.

Witnesses:
F. M. SUGHRUE,
R. R. MCNEELY.